United States Patent [19]
Bergmann et al.

[11] Patent Number: 6,064,522
[45] Date of Patent: May 16, 2000

[54] MINIATURE MASS PRODUCIBLE NON-RECIPROCAL DEVICES

[75] Inventors: Ernest Eisenhardt Bergmann, Borough of Fountain Hill, Pa.; Gustav E. Derkits, Jr., New Providence, N.J.

[73] Assignee: Lucent Technologies Inc, Murray Hill, N.J.

[21] Appl. No.: 09/103,299

[22] Filed: Jun. 23, 1998

[51] Int. Cl.[7] ................................................ G02B 5/30
[52] U.S. Cl. .......................................... 359/484; 359/280
[58] Field of Search ................................ 359/484, 280; 385/33

[56] References Cited

U.S. PATENT DOCUMENTS

| | | | |
|---|---|---|---|
| 5,040,863 | 8/1991 | Kawakami et al. | 359/484 |
| 5,204,771 | 4/1993 | Koga | 359/281 |
| 5,471,340 | 11/1995 | Cheng et al. | 359/281 |
| 5,808,793 | 9/1998 | Chang et al. | 359/484 |
| 5,930,418 | 7/1999 | Chang | 385/24 |

*Primary Examiner*—Scott J. Sugarman
*Assistant Examiner*—Margaret Burke

[57] ABSTRACT

An n by m array of lenses layer where n is greater than 1 and m is greater than 1 is disposed on a combination of layers comprised of a first walk-off layer, a first non-reciprocal rotator layer, a first half-wave plate layer, a second half-wave plate layer, a second walk-off layer, a second non-reciprocal rotator layer, and a mirror layer. A method of forming optical p by q structures, where p is greater than 1 is provided. An n by m array of lenses layer where n is greater than 1 and m is greater than 1 is disposed on a combination of layers. The combination of layers is formed of the layers described above. An n by m structure comprising the array of lenses and the combination of layers is formed which is then divided into p by q structures having a p by q array of lenses layer, where p is greater than 1. Preferably p by 1 optical circulator strips are formed. Preferably all layers are formed by lithographic methods. The n by m array of lenses can be formed by reactive ion etching. The first and second half-wave plate layers can be formed by forming an initial first and second half-wave plate layer and modifying the initial first and second half-wave plate layers, such as by etching holes or perforating through the initial first and second half-wave plate layer.

35 Claims, 7 Drawing Sheets

MINIATURE MASS PRODUCIBLE NON-RECIPROCAL DEVICES

FIELD OF THE INVENTION

This invention relates to improved methods and apparatus for optical isolators and circulators.

BACKGROUND OF THE INVENTION

Optical isolators and circulators are generally known to those skilled in the art. Generally speaking an optical circulator takes light in at a first port and outputs the light at a second port. However, light coming in the second port does not come out the first port but rather comes out a third port. (In an isolator there are only two ports, while in a circulator there are more than two ports). Thus an optical circulator is said to be a "non-reciprocal" device based on the above behavior. U.S. Pat. No. 5,204,771 to Koga, incorporated by reference herein, generally discloses various types of optical circulators. For example, FIG. 4 of that patent discloses an optical circulator 21 comprised of walk-off double refraction crystal plates 22, 23, and 24 and rotators 25 and 26. Light coming in port 27 exits out port 29. Light coming in port 29 exits out port 28.

U.S. Pat. No. 5,471,340 to Cheng et. al., incorporated by reference herein, also discloses various optical circulators. For example, FIG. 1A of that patent discloses walk-off birefringement crystals 24 and 32, half-wave plates 26 and 28, Faraday rotators 30 and 34, and mirror 36. Light coming in port 1 exits port 2, while light coming in port 2 exits port 3.

SUMMARY OF THE INVENTION

The present invention in some embodiments provides an apparatus comprised of an n by m (i.e. "n×m") array of lenses layer which can also be referred to as a lens array layer, where n is greater than 1 and m is greater than 1. The apparatus is also comprised of a combination of layers comprised of a first walk-off layer and a first non-reciprocal rotator layer. The lens array layer is preferably disposed on the combination of layers.

The combination of layers is preferably further comprised of a first half-wave plate layer, a second half-wave plate layer, a second walk-off layer, a second non-reciprocal rotator layer, and a mirror layer.

The lens array layer can be disposed adjacent the first walk-off layer of the combination of layers, and the layers of the combination of layers are disposed in the following order: The first walk-off layer is first, the first half-wave plate layer is disposed after the first walk-off layer, the second half-wave plate layer is disposed after the first half-wave plate layer, the first non-reciprocal rotator layer is disposed after the second half-wave plate layer, the second walk-off layer is disposed after the first non-reciprocal rotator layer, the second non-reciprocal rotator layer is disposed after the second walk-off layer, and the mirror layer is disposed after the second non-reciprocal rotator layer. Other orders are possible.

Preferably the first and second non-reciprocal rotator layers are 45 degree Faraday rotators made of latched garnet.

The present invention in one embodiment also includes a method of forming optical "p by q" (i.e. "p×q") structures, where p is greater than 1. The method preferably comprises the step of forming a lens array layer which is preferably an "n by m" (i.e. "n×m") array of lenses layer where n is greater than 1 and m is greater than 1. The method also comprises the step of forming a combination of layers by the steps of forming a walk-off layer and forming a non-reciprocal rotator layer. The n by m array of lenses layer is disposed on the combination of layers to form an n by m structure. The n by m optical structure is divided into "p by q" (i.e. "p×q") optical structures having a p by q array of lenses layer, where p is greater than 1. In the above method q preferably equals 1 meaning that "p by 1" (i.e. "p×1") optical circulator strips are formed.

The method preferably also includes the steps of forming further layers in the combination of layers. Preferably a first half-wave plate layer, a second half-wave plate layer, a second walk-off layer, a second non-reciprocal rotator layer, and a mirror layer are formed.

Preferably all features on each layer are formed by lithographic methods. In particular an n by m array of lenses can be formed by reactive ion etching ("RIE"). Lithographic methods which can be used with the present invention are disclosed in U.S. Pat. No. 5,079,130 to Gus Derkits, Jr., Issued on Jan. 7, 1992.

The first half-wave plate layer can be formed by forming an initial first half-wave plate layer and modifying the initial first half-wave plate layer, such as by etching holes or perforating through the initial first half-wave plate layer. The second half-wave plate layer can be formed in a similar manner.

The mirror layer may be partially transparent. An embodiment is also disclosed which does not have a mirror layer. The optical apparatus of this embodiment employs third and fourth half wave plate layers, a third walk off plate layer, and a second array of lenses layer.

DETAILED DESCRIPTION OF THE DRAWINGS

Figure 1:
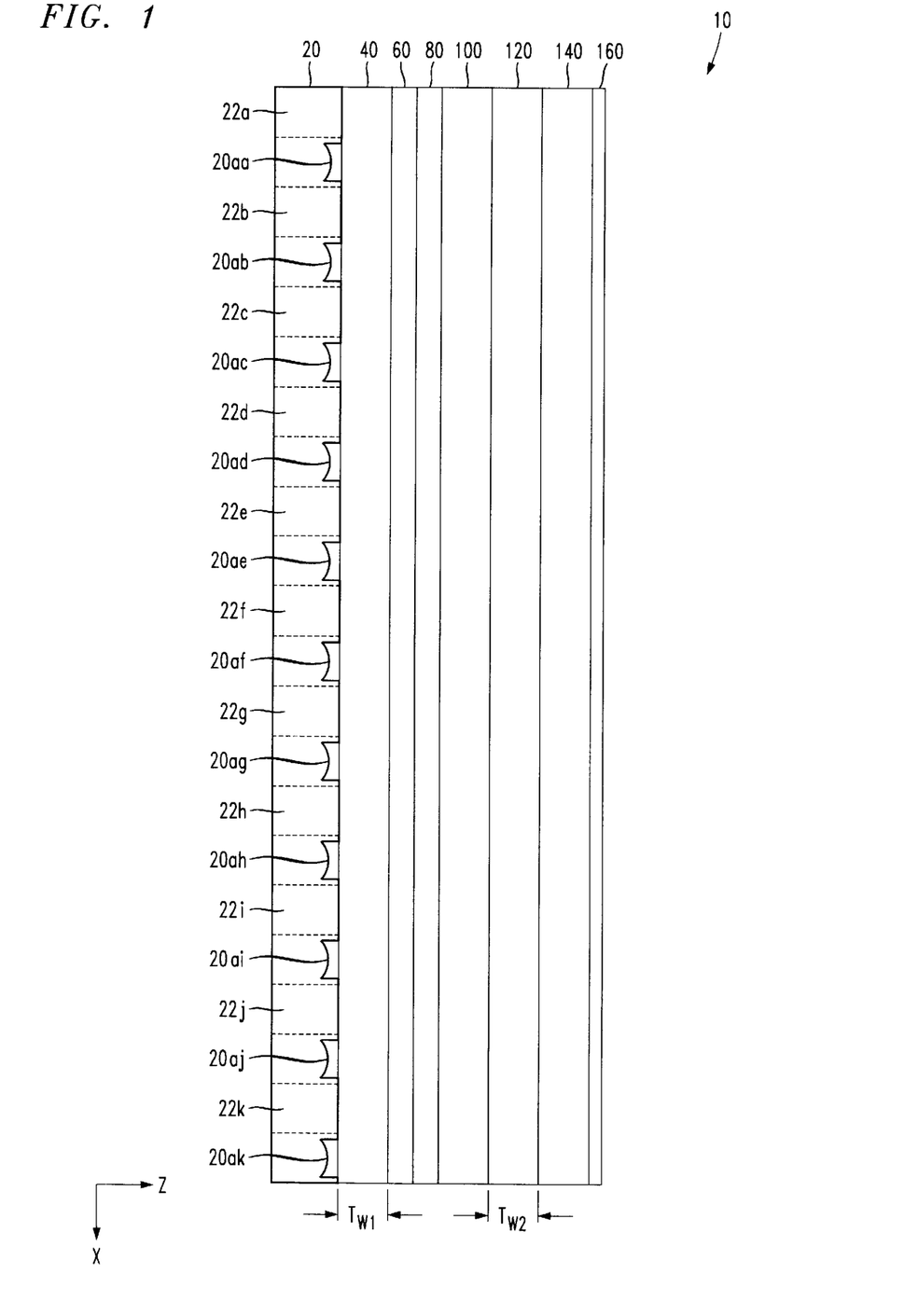
FIG. 1 shows an xz plane cross-sectional view of an optical apparatus in accordance with a first embodiment of the present invention.

FIG. 1 shows an xz plane cross-sectional view of an optical apparatus 10 in accordance with a first embodiment of the present invention. The optical apparatus 10 is comprised of an n by m array of lenses layer 20. In this case n=11 and m=11. The variables n and m can be much greater. Limits to n and m are set by available silicon art. The n by m array of lenses layer 20 is disposed next to a first walk-off layer 40. The first walk-off layer 40 is disposed adjacent to a first half-wave plate layer 60, which is disposed adjacent a second half-wave plate layer 80. The second half-wave plate layer 80 is disposed adjacent a first non-reciprocal rotator layer 100. The next layers are a second walk-off layer 120, a second non-reciprocal rotator layer 140, and a mirror layer 160.

Figure 5:
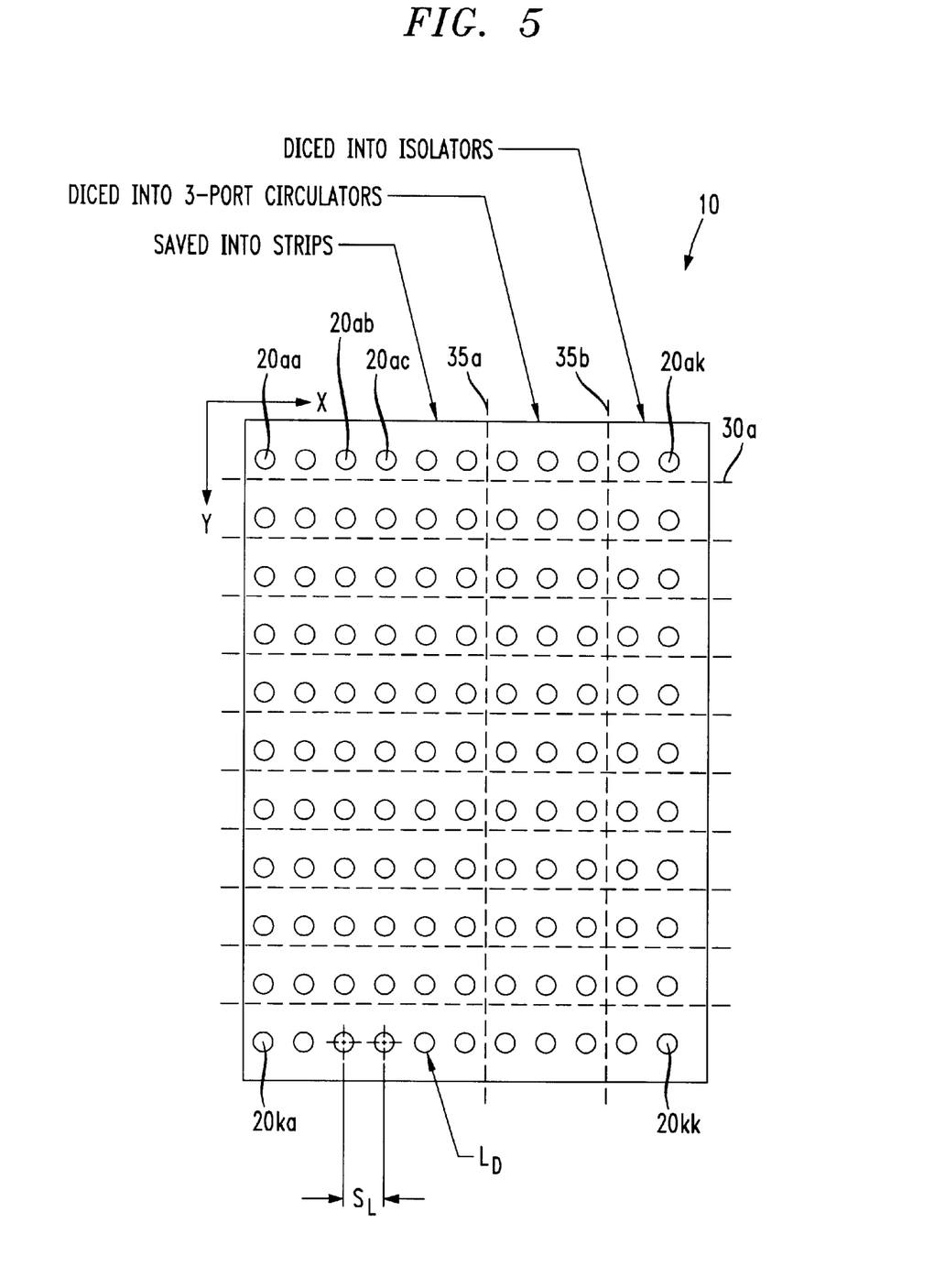
FIG. 5 shows an xy plane frontal view of the optical apparatus of FIG. 1.

Referring to the n by m array of lenses layer 20, in this instance the number of rows, n, equals 11, and the rows are labelled from "a" to "k" (1 to 11). The number of columns, m, equals 11, and the columns are labelled from "a" to "k". Each lens has a label corresponding to its row and column. For example as shown in FIG. 5, lens 20aa, is in row "a" and column "a" while lens 20kk is in row "k" and column "k". The lenses 20aa through 20kk and any other optical elements may be coated with non-reflective multilayers.

Returning to the xz plane view shown in FIG. 1, the cross-sectional view of lenses 20aa through 20ak are shown. These are the lenses for the top row "a", shown in FIG. 5 in top view, of the n by m array of lenses layer 20. All the lenses such as lens 20aa in this example have a convex face facing the first walk-off layer 40. To avoid the lenses 20aa through 20ak (and all other lenses in the n by m array of lenses 20) from touching the first walk-off layer 40, spacers 22a–22k may be provided. The spacers 22a–22k may in fact be just the unrecessed surfaces of lenses, i.e. they may be part of lenses 20aa through 20ak. Alternatively the lenses 20aa through 20ak (and the other lenses) may be recessed by RIE.

The n by m array of lenses layer 20 may be comprised of reactively ion etched lenses that can be made with lithographically controlled spacings. This allows for a very small spacing center to center, (i.e. from the center of one lens to its adjacent lens, spacing $S_L$, as shown in FIG. 5, which can be 0.125 mm. The spacing could be even less if lithographically defined planar glass waveguides from an integrated optical circuit are used. The lens diameter, $L_D$, shown in FIG. 5, can be approximately 50 to 100 micrometers in diameter. This is 4 to 5 times smaller than in prior art Gradient Index Lens ("GRIN") based designs for lenses. Although it is preferred that GRIN lenses not be used, it is possible to use them in accordance with the present invention. By lithographically defining a suitable material to diffuse into a glass sheet, one can make a GRIN lens array.

Figure 6A:
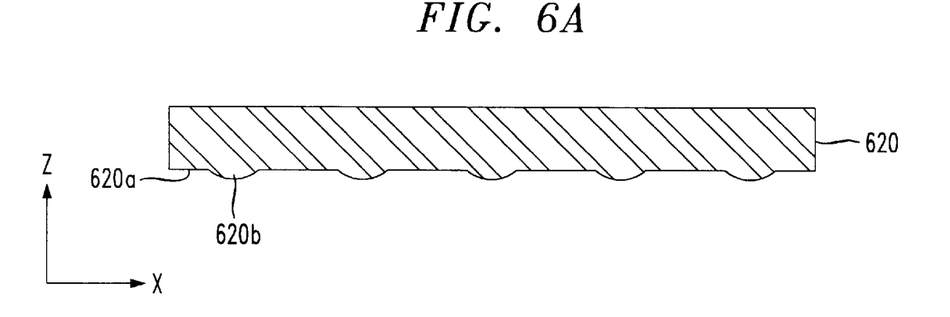
FIGS. 6A–D show xz plane views of various apparatus for use as an array of lenses layer or in connection with an array of lenses layer.
Figure 6B:
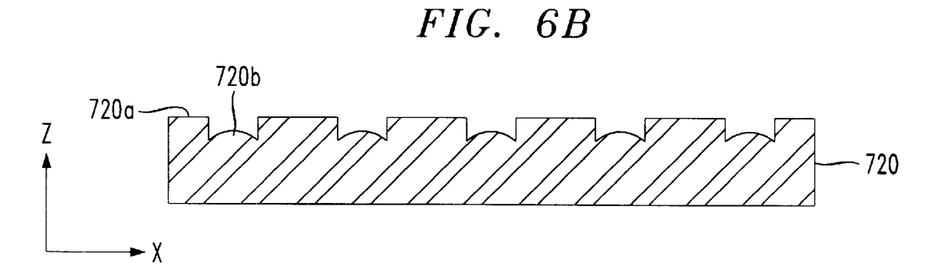
Figure 6C:
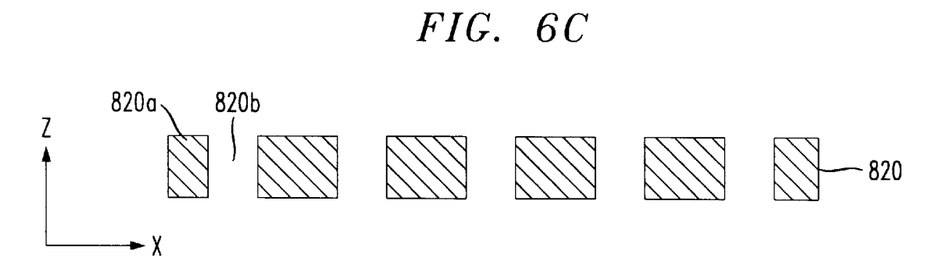
Figure 6D:
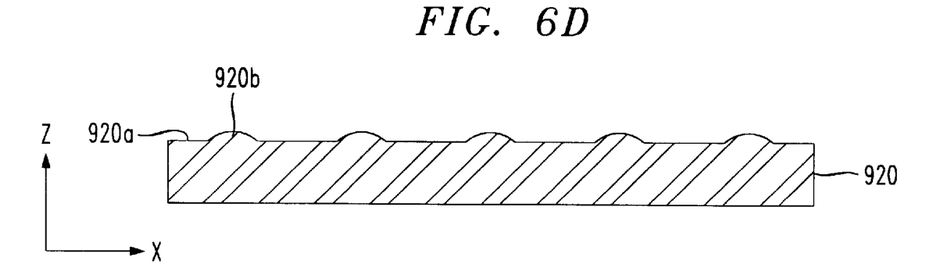

The n by m array of lenses layer 20 can be replaced by any of the n by m array of lenses layers 620, 720, and/or 920 in combination with or without the spacer apparatus 820 shown in FIGS. 6A–D. The FIGS. 6A–D only represent a portion of those array of lenses layers. FIG. 6A shows a cross sectional view of an n by m array of lenses layer 620 having a flat area 620a and a convex lens area 620b. FIG. 6B shows an n by m array of lenses layer 720 having virtually the same form as the n by m array of lenses layer 20 shown in FIG. 1. The n by m array of lenses layer 720 includes spacer section 720a and convex section 720b. FIG. 6C shows spacer apparatus 820 comprised of spacers 820a and empty space 820b. FIG. 6D shows an n by m array of lenses layer 920 having a flat area 920a and a lens area 920b.

Returning our attention to FIG. 1, the first walk-off layer 40 and the second walk-off layer 120 can be made much thinner than conventional walk-off layers in prior art devices, because of the smaller beam diameters and because of the tighter alignment control enforced if the preferred lithographic techniques are used. The first and second walk-off layers 40 and 120 can be comprised of calcite, rutile, or any strongly birefringement material. Both calcite and rutile have approximately a one in ten walk-off capability. For a lens center-to-center spacing $S_L$ of 0.125 millimeters (mm) shown in FIG. 5, walk-off thicknesses, $T_{w1}$ and $T_{w2}$ of 1.25 millimeters shown in FIG. 1, of the first walk-off layer 40 and the second walk-off layer 120, respectively, are adequate.

Figure 2:
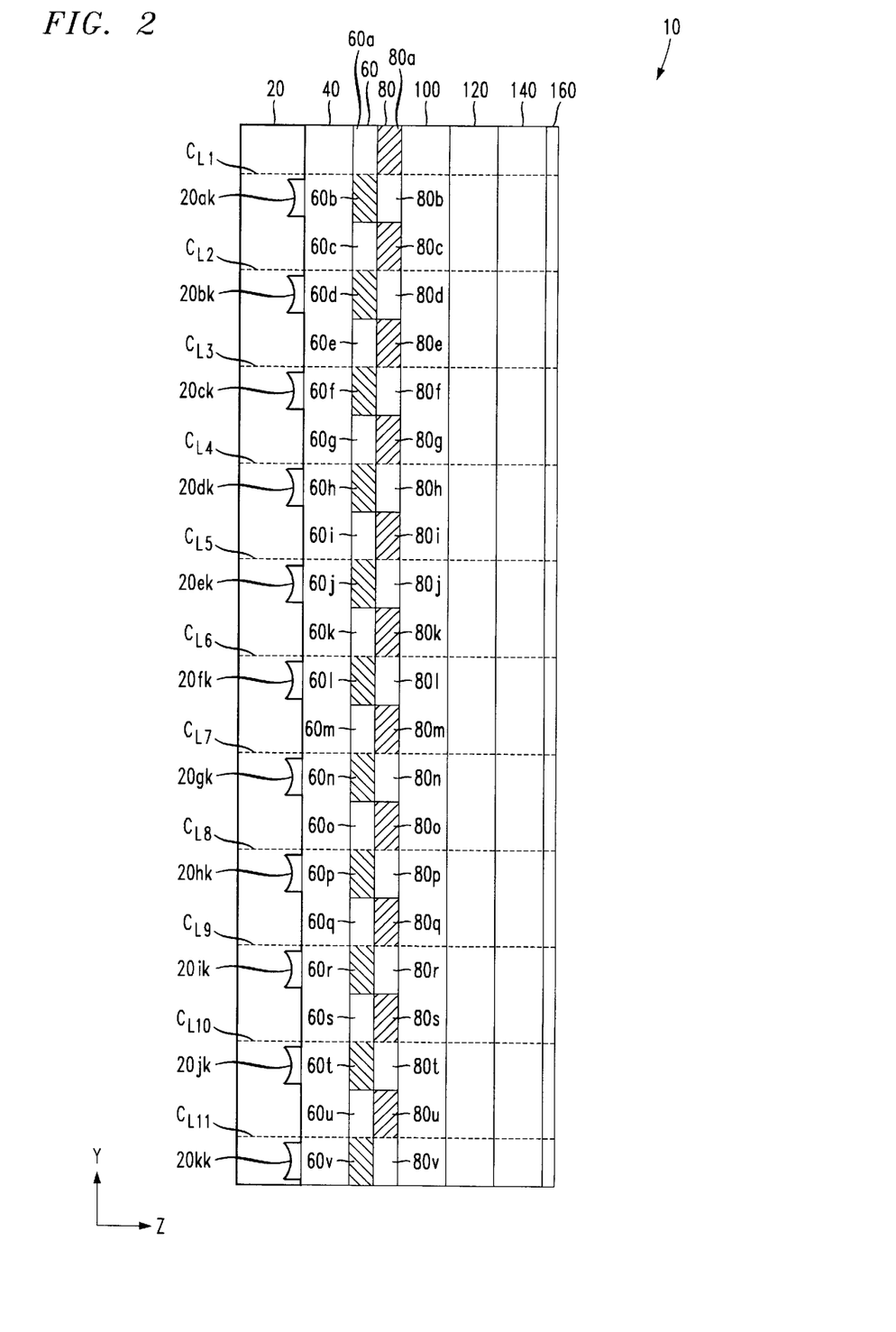
FIG. 2 shows a yz plane cross-sectional view of the optical apparatus of FIG. 1.

The first half-wave plate layer 60, as shown in FIGS. 1 and 2, is preferably disposed adjacent to the second half-wave plate layer 80. The use of two layers for 60 and 80 differs from typical side by side placement of half-wave plates as shown for plates 26 and 28 in the U.S. patent to Cheng et al. referred to above. In the present invention the first half-wave plate layers 60 and 80 are disposed as shown to allow for easier mass production of the optical apparatus 10.

A yz plane cross sectional view shown in FIG. 2 of the optical apparatus 10 shows perforations or etched holes in the first and second half-wave plate layers 60 and 80. First half-wave plate layer 60 is comprised of etched holes 60a, 60c, 60e, 60g, 60i, 60k, 60m, 60o, 60q, 60s, and 60u and solid portions 60b, 60d, 60f, 60h, 60j, 60l, 60n, 60p, 60r, 60t, and 60v. Second half-wave plate layer 80 is comprised of etched holes 80b, 80d, 80f, 80h, 80j, 80l, 80n, 80p, 80r, 80t, and 80v and solid portions 80a, 80c, 80e, 80g, 80i, 80k, 80m, 80o, 80q, 80s, and 80u.

The etched holes 60a, 60c, 60e, 60g, 60i, 60k, 60m, 60o, 60q, 60s, and 60u of first half-wave plate layer 60 are above their respective center lines $C_{L1}$, $C_{L2}$, $C_{L3}$, $C_{L4}$, $C_{L5}$, $C_{L6}$, $C_{L7}$, $C_{L8}$, $C_{L9}$, $C_{L10}$, and $C_{L11}$. The solid portions 60b, 60d, 60f, 60h, 60j, 60l, 60n, 60p, 60r, 60t, and 60v of first half-wave plate layer 60 are below their respective center lines $C_{L1}$, $C_{L2}$, $C_{L3}$, $C_{L4}$, $C_{L5}$, $C_{L6}$, $C_{L7}$, $C_{L8}$, $C_{L9}$, $C_{L10}$, and $C_{L11}$. The etched holes 80b, 80d, 80f, 80h, 80j, 80l, 80n, 80p, 80r, 80t, and 80v of the second half-wave plate layer 80 are below their respective center lines $C_{L1}$, $C_{L2}$, $C_{L3}$, $C_{L4}$, $C_{L5}$, $C_{L6}$, $C_{L7}$, $C_{L8}$, $C_{L9}$, $C_{L10}$, and $C_{L11}$. The solid portions 80a, 80c, 80e, 80g, 80i, 80k, 80m, 80o, 80q, 80s, and 80u are above their respective center lines $C_{L1}$, $C_{L2}$, $C_{L3}$, $C_{L4}$, $C_{L5}$, $C_{L6}$, $C_{L7}$, $C_{L8}$, $C_{L9}$, $C_{L10}$, and $C_{L11}$.

The yz planar view show in FIG. 2 of optical apparatus 10 shows lenses 20ak through 20kk, which are the lenses in the last column "k" shown in FIG. 5.

An example of light travel or light propagation in optical apparatus 10 is as follows. Light coming in from lens 20ak is split into two components by layer 40. (See Koga and Cheng et al. patents incorporated by reference herein for general technology). the first component proceeds above the center line $C_{L1}$ and the second component proceeds below the center line $C_{L1}$. The first component then proceeds through etched hole 60a, through solid portion 80a, through layers 100, 120, and 140, and is reflected by mirror layer 160. The second component proceeds through solid portion 60b, etched hole 80b, through layers 100, 120, and 140 and is reflected by mirror layer 160. The first and second components will pass back through the appropriate layers and then will be combined together by layer 40. Light coming in from lens 20aa will exit at lens 20ab, and light coming in on lens 20ab will exit at lens 20ac and so on. These lenses are shown in FIG. 5. The etched holes such as etched holes 60a and 80b are done so that the two different components of light travel through different materials analogous to the two different walk off plates "26" and "28" shown in FIG. 1B and FIG. 1C of Cheng et al., U.S. Pat. No. 5,471,340, which is incorporated by reference herein.

The first and second half-wave plate layers 60 and 80 may be one half wave quartz sheets.

Figure 3:
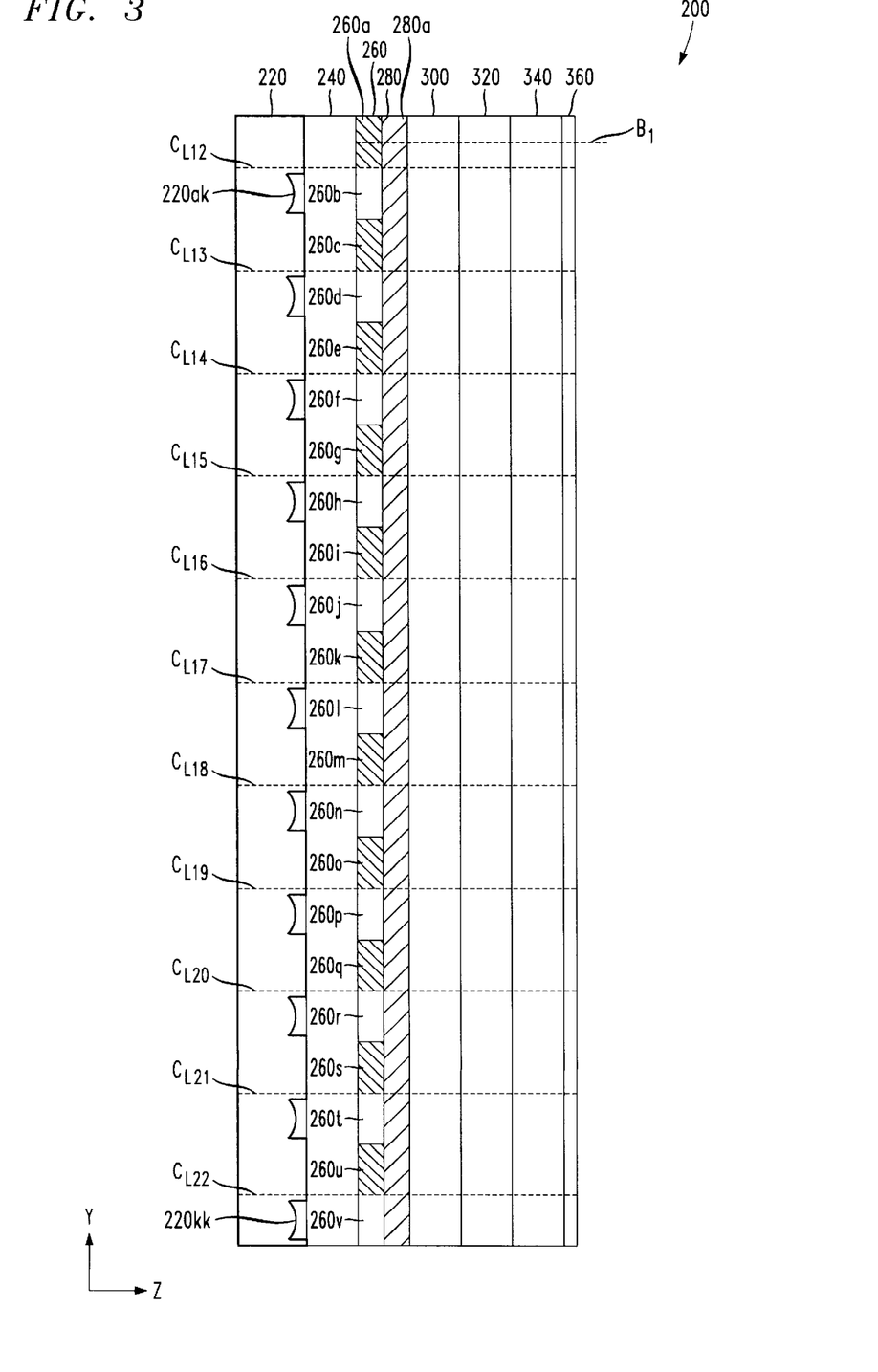
FIG. 3 shows a yz plane cross-sectional view of an optical apparatus in accordance with a second embodiment of the present invention.

A second embodiment in accordance with the present invention is shown as optical apparatus 200 in FIG. 3. The difference between the optical apparatus 200 and the optical apparatus 10 shown in FIG. 2, is that a second half-wave plate layer 280 differs from the second half wave plate layer 80 in that it does not have any perforations or etched holes and a first half-wave plate layer 260 differs from the first half wave plate layer 60 in that it has etched holes in different locations. Depending upon design details, one could have the holes in the same locations. For all these designs, one has to plan the orientation of the fast axis direction of each half wave sheet.

The first half-wave plate layer 260 has etched holes 260$b$, 260$d$, 260$f$, 260$h$, 260$j$, 260$l$, 260$n$, 260$p$, 260$r$, 260$t$, and 260$v$ which are below their respective center lines $C_{L12}$, $C_{L13}$, $C_{L141}$, $C_{L15}$, $C_{L16}$, $C_{L17}$, $C_{L18}$, $C_{L19}$, $C_{L20}$, $C_{L21}$, and $C_{L22}$ and solid portions 260$a$, 260$c$, 260$e$, 260$g$, 260$i$, 260$k$, 260$m$, 260$o$, 260$q$, 260$s$, 260$u$ which are above their respective center lines $C_{L12}$, $C_{L13}$, $C_{L14}$, $C_{L15}$, $C_{L16}$, $C_{L17}$, $C_{L18}$, $C_{L19}$, $C_{L20}$, $C_{L21}$, and $C_{L22}$. The disadvantage of the embodiment of FIG. 3 compared to FIG. 2 is that there may be asymmetry is polarization dependent path lengths, and also that epoxy may wick between the first half-wave plate layer 260 and the second half wave plate layer 280 where a light beam such as B1 would normally traverse. The advantage of using the optical apparatus 200 is that there are fewer perforations that have to be provided.

The purpose and material for layers 220, 240, 300, 320, 340, and 360 of FIG. 3 can be as described previously and hereinafter for layers 20, 40, 100, 120, 140, and 160 respectively of FIGS. 1 and 2.

Figure 4:
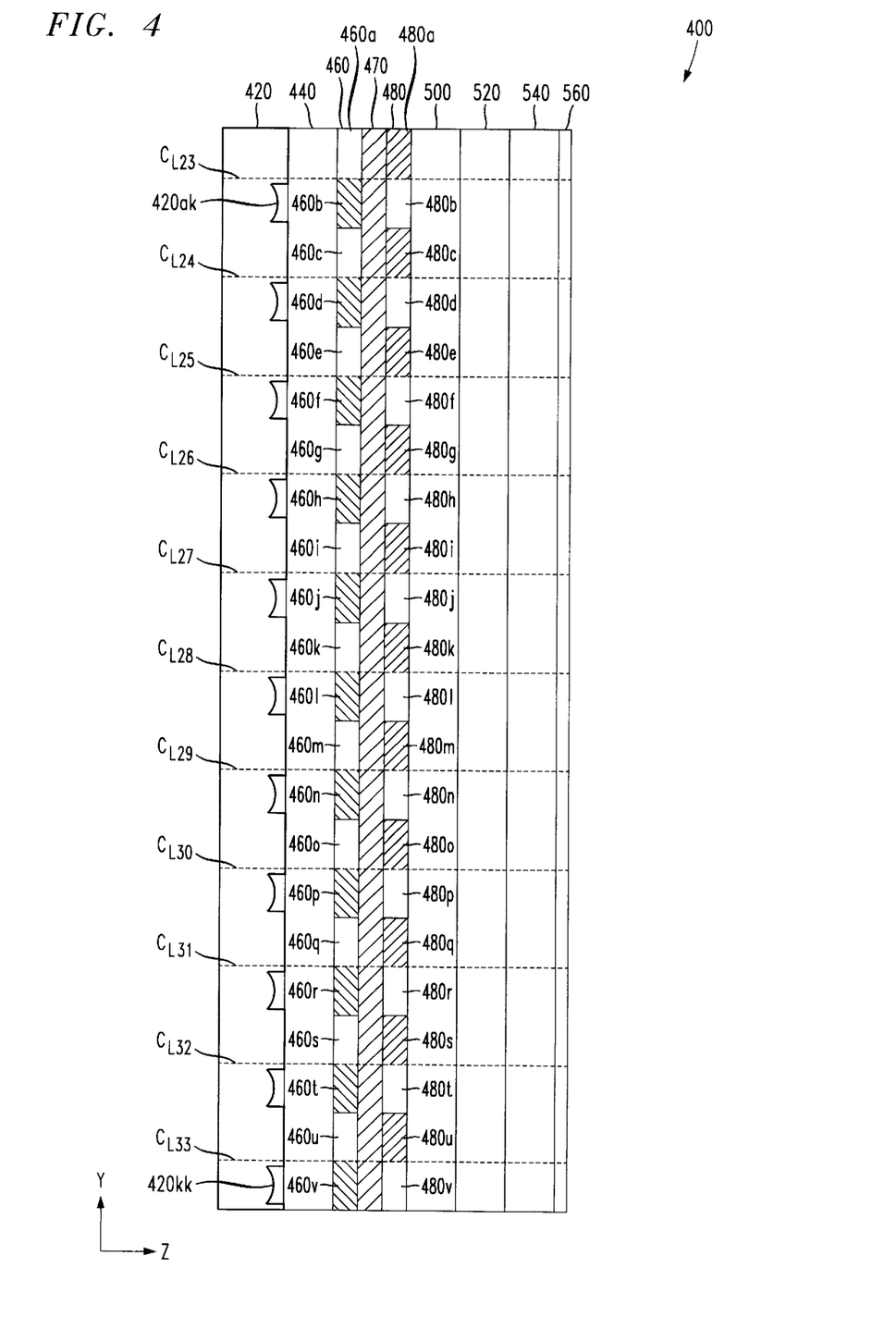
FIG. 4 shows a yz plane cross-sectional view of an optical apparatus in accordance with a third embodiment of the present invention.

FIG. 4 shows an optical apparatus 400 which is similar to FIG. 2 except for the inserted layer 470 between first half-wave plate layer 460 and second half-wave plate layer 480. This inserted layer 470 can also precede the first half-wave plate layer 460 or follow the second half-wave plate layer 480. The inserted layer 470 can be made out of polarization independent material such as glass or silica, and preferably is perforated or merely changes thickness in a manner analogous to the first half-wave layer 460 or the second half-wave layer 480 or a combination of the layers 260 and 280 shown in FIG. 3 or layers 60 and 80 shown in FIG. 2. (This detail is not drawn for 470 in FIG. 4). The inserted layer 470 can be used to reduce Polarization Mode Dependence "PMD" which is the difference in total optical path length depending on polarization.

The other aspects of the drawing for optical apparatus 400 of FIG. 4 are similar to FIG. 2. For example center lines $C_{L23}$, $C_{L24}$, $C_{L25}$, $C_{L26}$, $C_{L27}$, $C_{L28}$, $C_{L29}$, $C_{L30}$, $C_{L31}$, $C_{L32}$, and $C_{L33}$ are similar to center lines $C_{L1}$, $C_{L2}$, $C_{L3}$, $C_{L4}$, $C_{L5}$, $C_{L6}$, $C_{L7}$, $C_{L8}$, $C_{L9}$, $C_{L10}$, and $C_{L11}$, respectively. In addition layers 420, 440, 460, 480, 500, 520, 540, and 560 of FIG. 4 are similar to layers 20, 40, 60, 80, 100, 120, 140, and 160 of FIG. 2.

FIG. 5 shows an xy plane view of the optical apparatus 10 of FIG. 1. The lenses 20$aa$ through 20$kk$ have already been described with reference to FIG. 1. FIG. 5 also shows dashed lines for where sawcuts can be made to cut the optical apparatus 10 into strips of circulators in accordance with an embodiment of the present invention. Dashed lines 30$a$ are horizontal locations for making sawcuts for cutting the optical apparatus 10 into strips of material. Note that the dashed lines 30$a$ for sawcuts are preferably not in the same location as the center lines, such as center line $C_{L1}$. The dashed line 30$a$ for the sawcut preferably lies just below lenses 20$aa$ through 20$ak$ whereas the center line $C_{L1}$ preferably lies just above the lenses 20$aa$ through 20$ak$. Dashed lines 35$a$ and 35$b$, are exemplary vertical locations for making sawcuts for cutting the strips of material into isolators (two ports) or any number of ports for circulators. The cuts can be done in the reverse order, i.e. vertical first and then horizontal. The optical apparatus 10 can be cut into any p by q optical apparatus although preferably it is cut into p by 1 circulators. A example of cutting out a strip which is a three port circulator would be cutting along line 35$a$, cutting along line 35$b$, and cutting along line 30$a$. The section bounded by lines 35$a$, 35$b$, and 30$a$ would be a three port circulator. An example of cutting out a strip which is an isolator would be cutting along line 35$b$ and cutting along line 30$a$. The section bounded by lines 35$b$ and 30$a$ and the upper right hand corner of the optical apparatus 10 would be an isolator.

FIGS. 6A–D have previously been described with reference to FIG. 1.

The first and second non-reciprocal rotator layers 100 and 140 are preferably 45 degree Faraday rotators. Preferably latched Garnet is used for the rotator layers 100 and 140. The latched Garnet obviates the need for an externally provided saturating magnetic field. The rotator layers of latched garnet are about 0.5 millimeters thick when designing for an operating wavelength within the range of 1.5 to 1.6 micrometers (i.e. "microns"). A range of 1530 or 1560 microns is typical for dense wavelength division multiplexing and can also be used.

The rotator layer 140 could be replaced by a quarter wave plate. The quarter wave plate could be made from quartz and would be thinner and less costly. The quarter wave plate would have to be oriented properly whereas the Faraday rotator requires no orientation at all.

The mirror layer 160 could be a coating directly on the back end of the rotator layer 140. The mirror layer 160 may be slightly partially transparent perhaps reflecting 99% and transmitting about 1% of the incident light. This may be useful in a signal checking method. Partial transparency generally can be used for taking power from a signal to establish that a system is operating properly or as an operational characteristic of an information transmission system such as a local area network.

The rotator layer 140 can be replaced by quarter wave plates or three-quarter (¾) wave plates, with the fast axis at 45 degrees to the principle polarization directions. Such combinations will cause the reflected light with a principal polarization to reflect the light with the polarization "flipped" to the alternative polarization. The advantage of the quarter wave plate is the most wavelength independence, i.e. less wavelength dependent behavior. The advantage of the ¾-wave plate is its greater thickness may make its fabrication and handling easier (a quarter-wave plate at 1550 nanometers made from quartz is about 0.04 millimeters thick).

The first half wave plate layer 60, the second half wave plate layer 80 and the first non-reciprocal rotator 100 can be interchanged in any order, with suitable adjustments of the fast axis directions for the ½-wave plates.

Figure 7:
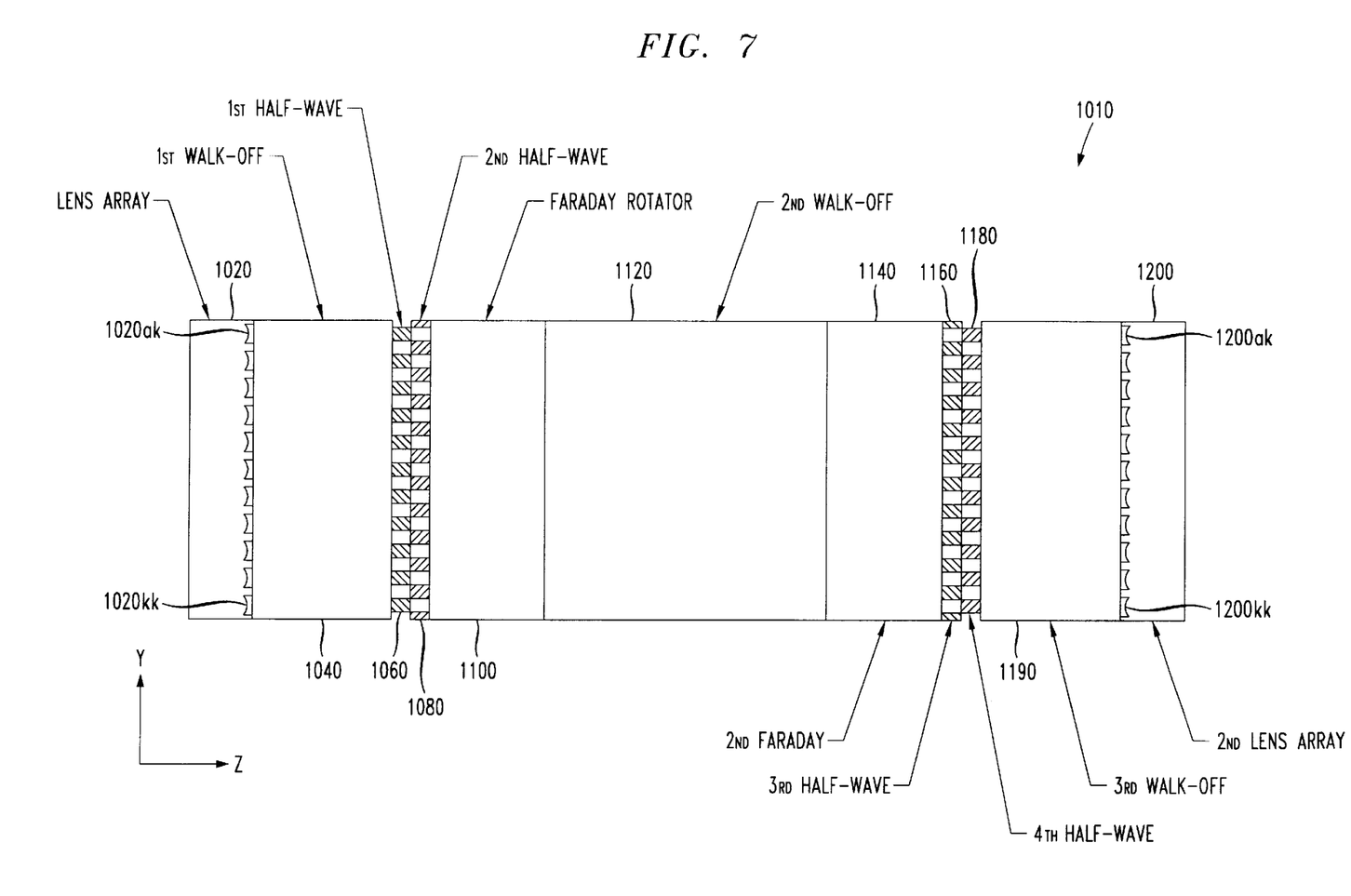
FIG. 7 shows an embodiment of the present invention which does not employ a mirror.

FIG. 7 shows an optical apparatus 1010 comprising an array of lenses layer 1020, a first walk-off plate layer 1040, a first half-wave layer 1060, a second half-wave layer 1080, a non-reciprocal rotator layer 1100, a second walk off plate layer 1120, a second non-reciprocal rotator layer 1140, a third half wave plate layer 1160, a fourth half wave plate layer 1180, a third walk off plate layer 1190 and a second array of lenses layer 1200.

The first half wave layer 1060 and the fourth half wave layer 1180 are arranged in the same pattern. The second half wave layer 1080 and the third half wave layer 1160 are arranged in the same pattern. The pattern of the layers 1060, 1080, 1160 and 1180 can be formed by lithography and then transferred to become a part of the optical apparatus 1010.

This is also true of the optical apparatus 10, 200, and 400. The transfer process can be done by reactive ion etching ("RIE").

The n by m optical apparatus 1010 can also be cut up into other p by q optical apparatus like the optical apparatus 10 of FIG. 1. Contrary to the apparatus of FIG. 1 which acts as a circulator with waveguides coupled only on the left side (incorporating aspects similar to Cheng et al. U.S. Pat. No. 5,471,340), the embodiment of FIG. 7 acts as a transmission circulator between waveguides coupled on both the left and right sides (incorporating aspects similar to U.S. Pat. No. 5,204,771 to Koga).

I claim:

1. An apparatus comprised of:
    an n by m array of lenses layer where n is greater than 1 and m is greater than 1;
    a combination of layers comprised of:
        a first non-reciprocal rotator layer; and
        a mirror layer;
    wherein the n by m array of lenses layer is disposed amongst the combination of layers; and
    wherein the n by m array of lenses layer, the first non-reciprocal rotator layer, and the mirror layer are disposed so that light after passing through the n by m array of lenses layer passes through the first non-reciprocal rotator layer, and afterwards impinges on the mirror layer.

2. The apparatus of claim 1 and wherein:
    the combination of layers is further comprised of:
        a first walk-off layer.

3. The apparatus of claim 2 wherein:
    the combination of layers is further comprised of:
        a first half-wave plate layer;
        a second half-wave plate layer; and
        a second walk-off layer.

4. The apparatus of claim 3 and wherein:
    the combination of layers is further comprised of:
        a second non-reciprocal rotator layer.

5. The apparatus of claim 1 wherein:
    the first non-reciprocal rotator layer is a Faraday rotator.

6. The apparatus of claim 4 wherein:
    the first and second non-reciprocal rotator layers are Faraday rotators.

7. A method of forming optical circulator strips comprising of the steps of:
    forming an n by m array of lenses layer where n is greater than 1 and m is greater than 1;
    forming a combination of layers by the steps of:
        forming a walk-off layer;
        forming a non-reciprocal rotator layer;
    disposing the n by m array of lenses layer on the combination of layers to form an n by m structure;
    dividing the n by m structure into p by q structures having a p by q array of lenses layer, where p is greater than 1.

8. The method of claim 7 wherein q equals 1.

9. The method of claim 7 and further wherein:
    the step of forming the combination of layers further comprises the steps of:
        forming a first half-wave plate layer;
        forming a second half-wave plate layer; and
        forming a second walk-off layer.

10. The method of claim 9 and further comprising the step of:
    forming a second non-reciprocal rotator layer.

11. The method of claim 10 and further comprising the step of:
    forming a mirror layer.

12. The method of claim 11 and wherein:
    the steps of forming one or more layers of the combination of layers of the n by m array of lenses layer are performed by lithography.

13. The method of claim 11 wherein:
    the step of forming the first half-wave plate layer comprises the steps:
        forming an initial first half-wave plate layer;
        modifying the initial first half-wave plate layer.

14. The method of claim 13 wherein:
    the initial first half-wave plate layer is modified by etching holes through the initial first half-wave plate layer.

15. The method of claim 13 wherein:
    the step of forming the second half-wave plate layer comprises the steps of:
        forming an initial second half-wave plate layer;
        modifying the initial second half-wave plate layer.

16. The method of claim 15 wherein:
    the initial second half-wave plate layer is modified by etching holes through the initial second half-wave plate layer.

17. The method of claim 7 wherein:
    the step of forming the n by m array of lenses layer is comprised of etching the n by m array of lenses layer.

18. The method of claim 17 wherein:
    the step of forming the n by m array of lenses layer is comprised of reactively ion etching the n by m array of lenses layer.

19. The method of claim 11 wherein:
    the first and second walk-off plate layers are formed from calcite.

20. The method of claim 11 wherein:
    the first and second walk-off plate layers are formed from rutile.

21. The method of claim 7 wherein:
    the first non-reciprocal rotator is a Faraday rotator.

22. The method of claim 21 wherein:
    the first non-reciprocal rotator is a 45 degree Faraday rotator.

23. The method of claim 22 wherein:
    the first non-reciprocal rotator is comprised of latched garnet.

24. The method of claim 11 further comprising the step of:
    forming the mirror layer so that it is at least partially transparent.

25. The method of claim 12 and wherein:
    the steps of forming one or more layers of the combination of layers of the n by m array of lenses layer are performed by forming a pattern in one or more layers by lithography and then adding the one or more layers to form the combination of layers.

26. An apparatus comprised of:
    an n by m array of lenses layer where n is greater than 1 and m is greater than 1;
    a combination of layers comprised of:
        a first non-reciprocal rotator layer;
        a first walk-off layer;
        a first half-wave plate layer;
        a second half-wave plate layer;

a second walk-off layer; and
a second non-reciprocal rotator layer;
wherein the n by m array of lenses layer is disposed amongst the combination of layers.

27. The apparatus of claim 26 and wherein:
the combination of layers is further comprised of:
a mirror layer.

28. The apparatus of claim 27 wherein:
the n by m array of lenses layer is disposed adjacent the first walk-off layer of the combination of layers; and
the layers of the combination of layers are disposed in the following order:
the first walk-off layer is first;
a subcombination of the following layers is disposed next, the subcombination comprising:
the first half-wave plate layer,
the second half-wave plate layer, and
the first non-reciprocal rotator layer;
the second walk-off layer is disposed after the subcombination of layers;
the second non-reciprocal rotator layer is disposed after the second walk-off layer; and
the mirror layer is disposed after the second non-reciprocal rotator layer.

29. The apparatus of claim 26 wherein:
the first and second non-reciprocal rotator layers are Faraday rotators.

30. The apparatus of claim 27 wherein:
the n by m array of lenses layer is disposed adjacent the first walk-off layer of the combination of layers; and
the layers of the combination of layers are disposed in the following order:
the first walk-off layer is first;
a subcombination of the following layers is disposed next, the subcombination comprising:
the first half-wave plate layer,
the second half-wave plate layer, and
the first non-reciprocal rotator layer;
the second walk-off layer is disposed after the subcombination of layers;
the second non-reciprocal rotator layer is disposed after the second walk-off layer; and
the mirror layer is disposed after the second non-reciprocal rotator layer.

31. An apparatus comprised of:
an n by m array of lenses layer where n is greater than 1 and m is greater than 1;
a combination of layers comprised of:
a first non-reciprocal rotator layer;
a first walk-off layer;
a first half-wave plate layer;
a second half-wave plate layer; and
a second walk-off layer;
wherein the n by m array of lenses layer is disposed amongst the combination of layers; and
wherein the first half-wave plate layer is comprised of:
a plurality of portions of a first type each comprised of a first material;
and a plurality of portions of a second type each comprised of a second material;
wherein the second half-wave plate layer is comprised of:
a plurality of portions of a third type each comprised of a third material;
and a plurality of portions of a fourth type each comprised of a fourth material.

32. The apparatus of claim 31 wherein
the first material and the third material are in the form of etched holes;
and the second and fourth material are in the form of a solid portion.

33. The apparatus of claim 32 wherein
each portion of the first type of the first half-wave plate layer, which is an etched hole, lines up with a portion of the fourth type of the second half-wave plate layer, which is a solid portion, so that light passing through an etched hole of the first half-wave plate layer next passes through a solid portion of the second half-wave plate layer; and
each portion of the second type of the first half-wave plate layer, which is a solid portion, lines up with a portion of the third type of the second half-wave plate layer, which is an etched hole, so that light passing through a solid portion of the first half-wave plate layer next passes through an etched hole of the second half-wave plate layer.

34. A method comprised of:
forming a combination of layers comprised of:
a first non-reciprocal rotator layer;
an n by m array of lenses layer where n is greater than 1 and m is greater than 1;
wherein the n by m array of lenses layer is disposed amongst the combination of layers on the outer part of the combination of layers so that light can be supplied directly to each lens in the array of lenses layer from a waveguide external to the combination of layers.

35. A method of forming optical circulator strips comprising of the steps of:
forming an n by m array of lenses layer where n is greater than 1 and m is greater than 1;
forming a combination of layers by the steps of:
forming a walk-off layer;
forming a non-reciprocal rotator layer;
disposing the n by m array of lenses layer on the combination of layers to form an n by m structure, wherein there is a distance of separation between the centers of any pair of adjacent lenses in the array of lenses layer, and the distance of separation between the centers of any first pair of adjacent lenses is substantially the same as the distance of separation of any second pair of adjacent lenses;
dividing the n by m structure into p by q structures having a p by q array of lenses layer, where p is greater than 1.

* * * * *